(12) United States Patent
Denes et al.

(10) Patent No.: US 7,138,180 B2
(45) Date of Patent: Nov. 21, 2006

(54) HARD CARBON FILMS FORMED FROM PLASMA TREATED POLYMER SURFACES

(75) Inventors: Ferencz Denes, Madison, WI (US); Sorin Manolache, Madison, WI (US); Luis Cruz-Barba, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 10/686,790

(22) Filed: Oct. 16, 2003

(65) Prior Publication Data
US 2005/0084680 A1 Apr. 21, 2005

(51) Int. Cl.
*B32B 9/04* (2006.01)
*B05D 1/08* (2006.01)

(52) U.S. Cl. ............... 428/411.1; 427/446; 428/412; 428/417; 428/426; 428/522; 428/523

(58) Field of Classification Search ........... 428/412, 428/522, 523; 427/446
See application file for complete search history.

(56) References Cited

U.S. PATENT DOCUMENTS

| | | | |
|---|---|---|---|
| 2,697,028 A * | 12/1954 | Baker et al. ............ 264/9 |
| 4,187,331 A | 2/1980 | Hsioh-Lien Ma |
| 4,253,888 A | 3/1981 | Kikuchi |
| 4,264,750 A | 4/1981 | Anand et al. |
| 4,404,256 A | 9/1983 | Anand et al. |
| 4,975,144 A | 12/1990 | Yamazaki et al. |
| 5,190,807 A | 3/1993 | Kimock et al. |
| 5,445,710 A | 8/1995 | Hori et al. |
| 5,487,810 A | 1/1996 | Thurm et al. |
| 5,552,226 A | 9/1996 | Thurm et al. |
| 5,643,343 A * | 7/1997 | Selifanov et al. ............ 51/306 |
| 5,688,410 A | 11/1997 | Kajitani et al. |
| 5,693,376 A | 12/1997 | Fetherston et al. |
| 6,207,583 B1 | 3/2001 | Dunne et al. |
| 6,245,489 B1 | 6/2001 | Baklanov et al. |
| 6,258,407 B1 | 7/2001 | Lee et al. |
| 6,265,068 B1 * | 7/2001 | David et al. ............ 428/403 |
| 6,372,303 B1 | 4/2002 | Burger et al. |
| 6,379,741 B1 | 4/2002 | Komvopoulos et al. |
| 6,506,457 B1 | 1/2003 | Hum |
| 6,572,935 B1 | 6/2003 | He et al. |
| 2002/0142105 A1 | 10/2002 | Hum |

OTHER PUBLICATIONS

Denes, F. et al., "Influence of RF-Cold Plasma Treatment on the Surface Properties of Paper," *J.M.S.-Pure Appl. Chem.*, A32(8&9), pp. 1405-1443 (1995); published by Marcel Dekker, Inc.
Knight, D. B., "Near-frictionless carbon resists wear and abrasion," *Advanced Materials & Processes*, p. 14, Dec. 2002; Website: www.anl.gov.

(Continued)

*Primary Examiner*—James J. Seidleck
*Assistant Examiner*—Saira Raza
(74) *Attorney, Agent, or Firm*—Foley & Lardner LLP (57) ABSTRACT

Hard-carbon films with unique structures, methods for producing the films, and articles coated by the films are provided. These hard-carbon films are synthesized by the plasma surface treatment of a polymer substrate or a polymer-coated substrate in a plasma containing $SF_x$ species, where x is less than 6, and may be produced under room temperature, low pressure environments.

18 Claims, 9 Drawing Sheets

OTHER PUBLICATIONS

Cruz-Barba, L. E. et al., "Novel Plasma Approach for the Synthesis of Highly Fluorinated Thin Surface Layers," *Langmuir* 2002, 18, pp. 9393-9400; published by the American Chemical Society.

Bento, Wanderson C.A. et al., "Enhancement in Polymer Hydrophobicity by $SF_6$ Plasma Treatment," http://www.sbf1.if.usp.br/eventos/ebfp/6/programa/res0105.pdf.

* cited by examiner

HARD CARBON FILMS FORMED FROM PLASMA TREATED POLYMER SURFACES

STATEMENT OF GOVERNMENT INTERESTS

This invention was made with United States government support awarded by the following agencies: USDA/CS-REES 02-CRHF-0-6055. The United States government has certain rights in this Invention.

BACKGROUND OF THE INVENTION

Diamond has captured the attention of scientists for a long time because of its extreme properties. It is the hardest known material (~90 GPa), and until recently was considered to have the highest bulk modulus ($1.2 \times 10^{12}$ N/m$^2$) and lowest compressibility. It has the highest known thermal conductivity at room temperature ($2 \times 10^3$ W/m·K) and an extremely low thermal expansion coefficient ($0.8 \times 10^{-6}$ K$^{-1}$). It is characterized by a broad optical transparency in the UV and IR regions. It is an electric insulator with a resistivity at room temperature of ~$10^{16}$ Ω·cm, which may vary over a range as large as $10$–$10^{16}$ Ω cm when it is doped. It is biocompatible, and exhibits negative electron affinity. See May, P. W., *CVD Diamond—A New Technology for the Future*, Endeavour Magazine 1995, 19(3), pp 101–106.

The first synthetic diamond crystals were produced from graphite using very high pressures and temperatures during the early 1950s, independently by two research teams, one in Sweden (Allmänna Svenska Elektriska Aktiebolaget) and the other in the USA (General Electric Company). See Ball, P., *Hard Work: Diamond and Hard Materials*, In Made to Measure: New Materials for the 21$^{st}$ Century, Princeton University Press, 1999, p 313. During the subsequent decades the high pressure, high temperature GE diamond producing technology attained commercial status and has now become available world-wide.

The interest in diamond has once again resurged due to research demonstrating that polycrystalline diamond films and diamond-like carbon films can be deposited at low pressures and at relatively low temperatures by using techniques such as Chemical Vapor Deposition (CVD). Presently, all CVD approaches employed for the deposition of diamond films require the presence of activated carbon-containing precursors. Other methods for the synthesis of diamond films have involved the use of thermal, plasma, and combustion-flame approaches.

Most of the diamond and diamond-like carbon (DLC) films have been synthesized by starting with hydrocarbon (HC) precursors such as methane and acetylene. Studies have demonstrated that even if graphite, and not diamond, is the thermodynamically stable solid carbon allotrope, diamond and diamond-like structures could be produced at low pressures and temperatures in the presence of hydrogen atoms. See Landis, C.; Cleveland, T.; Cloninger, M. J.; and Pollock, D., *Buckyballs, Diamond, and Graphite*, In Topic Oriented Approach Development, available online at www.chem.wisc.edu/~newtrad/CurrRef/TOAHome/TOA-Home; Davis, R. F. Ed. *Diamond Films and Coatings*, Noyes Publications, 1993; and Monaghan, D. P.; Laing, K. C.; Logan, P. A.; Teer, P. and Teer, D. G., *How to deposit DLC successfully*, Materials World 1993, 1(6), pp 347–349. The role of hydrogen atoms in the formation of diamond and DLC structures has been attributed to a number of factors. These include, (i) their efficiency for abstracting hydrogen atoms from the precursor hydrocarbon molecules, thereby generating an "activated" carbon-based species, (ii) their ability to "neutralize" surface dangling bonds thereby preventing cross-linking reaction mechanisms which are responsible for the formation of graphitic structures; and (iii) their etching specificity under certain experimental conditions, which provides preference for diamond formation at the expense of graphite.

During CVD and Plasma Enhanced CVD (PECVD) processes, the activated molecular fragments resulting from a specific HC/H$_2$ mixture are deposited on substrate surfaces at 600–900° C. These high temperatures are usually required to shift the reaction equilibrium towards the formation of diamond structures. However, the high substrate temperatures considerably limit the applications of these films because they cannot be deposited on temperature-sensitive substrates, such as polymers and low melting point alloys. Moreover, CVD techniques result in deposition of films composed of a network of small diamond crystals in the micrometer range, which may be unsuitable for applications requiring highly uniform and smooth films.

SUMMARY OF THE INVENTION

Hard-carbon films with unique structures, methods for producing the films, and articles coated with the films are provided. These hard-carbon films are synthesized by the plasma surface treatment of a polymer substrate or a polymer-coated substrate in a plasma containing SF$_x$ species, where x is less than 6, and may be produced under room temperature, low pressure environments.

The hard-carbon films may be produced by exposing an organic polymeric surface to a plasma containing SF$_x$ species, where x is less than 6, and under reaction conditions suitable for converting the polymeric surface into a diamond-like carbon film. The films provide hard, low friction surfaces that may be used in a large number of applications. Under certain plasma reaction conditions, films may be produced having a Mohs hardness value of at least 9 measured by the wearing of a ruby ball (Mohs hardness of 9) dragged in a circular motion on the films during fretting wear tests.

The hard films may be characterized by a high carbon content. For example, the carbon content in the hard films may be at least about 90 atomic percent. The hard films may also be characterized by low oxygen and hydrogen contents. For example, the oxygen and hydrogen contents of the films may each be less than about 5 atomic percent. The plasma conditions are desirably chosen such that little or no surface-fluorination occurs during the treatment of the surface. As such, in some embodiments, the films may have a fluorine content of less than about 2 atomic percent.

The hard carbon films may be produced in any suitable plasma reactor, many of which are known and commercially available. The plasma contains SF$_x$ species, where x may be from 1 to 5, which may be produced from sulfur hexafluoride gas in the reactor. The plasma may optionally be substantially free of one or more of the following: hydrogen gas, oxygen gas, and hydrocarbon precursors.

The surface to be treated may simply be the surface of a polymeric substrate. Alternatively, the surface may be a polymeric coating on an underlying substrate. In the latter embodiment the substrate may be composed of a variety of materials, including, but not limited to, metals, polymers and ceramics. Suitable polymeric surface materials include poly (acrylic acid) (PAA), poly(methyl methacrylate) (PMMA) and polycarbonate (PC). Poly(acrylic acid) makes a particularly desirable polymeric substrate coating.

The combination of high-hardness and low-friction makes these coatings extremely attractive for numerous tribological applications. Furthermore, the fact that they can be produced at ambient temperatures and over large surface areas makes it commercially attractive from the stand-point of cost-effectiveness and flexibility in the different substrate materials and geometries that can be treated.

Further objects, features and advantages of the invention will be apparent from the following detailed description when taken in conjunction with the accompanying drawings.

DETAILED DESCRIPTION OF THE PREFERRED EMBODIMENTS

This invention provides diamond-like films produced by converting polymeric surfaces into hard carbon films. Also provided are plasma treatment methods for producing the films and plasma treated articles coated with the films. These hard-carbon films are synthesized by exposing a polymer surface to a plasma containing $SF_x$ species, where x is less than 6, under conditions that allow the polymeric film to be converted into a hard, high carbon-content film. The treated surfaces may be the surfaces of an appropriate polymeric substrate or they may be composed of a polymeric coating on a substrate. The films may be formed under room temperature, low pressure environments. The films differ from conventional carbon films produced using hydrocarbon precursors in that the films are made by converting the carbon in the polymeric surfaces into a hard carbon film, without the need to deposit carbon from precursor molecules.

The films may be produced on a variety of articles having a wide range of shapes and sizes, provided the articles have a suitable organic polymeric surface. Suitable articles include, but are not limited to, windows, medical implants, lenses, such as eyeglass lenses, and the like.

The films are characterized by high hardness and low friction and may be produced relatively easily and inexpensively over large surface areas on a variety of articles. In some embodiments, the films will have a carbon content of at least about 90 atomic percent. This includes embodiments where the films have a carbon content of at least about 92 atomic percent, further includes embodiments where the films have a carbon content of at least about 95 atomic percent and still further includes embodiments where the films have a carbon content of at least about 98 atomic percent. It follows that the films will have correspondingly low levels of other atoms, such as oxygen, hydrogen or fluorine. For example, in some embodiments the films will have an oxygen content of no more than about 5 atomic percent. This includes embodiments where the oxygen content in the films is no more than about 3 atomic percent and still further includes embodiments where the oxygen content is no more than about 1 atomic percent. Similarly, in some embodiments the films will have a hydrogen content of no more than about 5 atomic percent. This includes embodiments where the hydrogen content in the films is no more than about 3 atomic percent and still further includes embodiments where the hydrogen content is no more than about 1 atomic percent. The plasma treatment of the polymeric surfaces is desirably conducted under conditions that disfavor surface fluorination. Thus, in some instances the fluorine content of the films is no more than about 2 atomic percent, in some cases no more than about 1 atomic percent and in still other cases no more than about 0.5 atomic percent. In still other cases fluorine is substantially absent from the films.

The films desirably have high hardness values. Hardness may be measured using a low-load microhardness test, such as Knoop micro-indentation. For example, the films provided herein include, but are not limited to, those having a hardness value as measured by low-load Knoop microhardness at a load of 5 grams of at least 1300 kg/mm². In some embodiments, the films have a Mohs hardness value of at least 9 and in some instances at least 9.5 as determined by the fretting wear test, where a ruby ball (Mohs hardness of 9) is worn out when dragged in a circular motion on top of the film. The films may also desirably have low friction. The friction of the films may also be measured using a fretting wear test. This test is described in detail in the examples section below. For example, the films may have frictions of no more than about 22% relative to hardened steel (40 vs. 180 arbitrary units) as measured by the fretting wear test. This includes films having frictions of no more than about 15% and further includes films have frictions of no more than about 13% as measured by the fretting wear test.

The thickness of the hard carbon films may vary depending on the desired application and may be controlled by the conditions of the plasma treatment, including the duration of exposure to the plasma. However, the films may typically have a thickness of up to and including about 10 microns. This includes films having a thickness up to and including about 5 microns, desirably from about 0.5 to about 5 microns. Films of up to about 5 microns will typically be optically transparent. Although, the films disclosed herein are not limited to those having a thickness in the above-cited ranges.

Without wishing or intending to be bound to any particular theory of the invention, the inventors believe that the plasma treatment has a two-fold affect on such polymeric surfaces. Specifically, it is believed that under appropriate plasma conditions, the $SF_{(1-5)}$ species in the plasma extract oxygen and/or hydrogen atoms from the surface layers, leaving the dangling carbons bonds to react with one another, while simultaneously and preferentially etching away less ordered surface zones or domains relative to the more ordered domains. The resulting hard carbon films are heavily cross-linked networks having very high carbon content and are characterized by ordered macromolecular structures. As such, the hard carbon films produced herein differ significantly from more conventional diamond-like carbon films, such as those made from plasma deposition of hydrocarbon precursors, which are characterized by polycrystalline structures composes of crystalline domains embedded in amorphous domains.

Polymeric surfaces that may be converted into hard-carbon films according to the plasma treatment methods disclosed herein may be composed of high or low molecular weight polymers. The polymers desirably contain carbon, oxygen and hydrogen atoms. Examples of such polymers include, but are not limited to poly(acrylic acid), poly (methyl methacrylate) and polycarbonate. When non-oxygen-containing polymers, such as polyethylene, polypropylene and polystyrene are used, it is desirable for the polymers to be at least partially oxidized prior to plasma treatment. In some instances the substrates are themselves polymers. In other cases, the polymers are coated or deposited onto a substrate of a different material in order to provide a polymeric surface. Poly(acrylic acid) is a desirable substrate coating. When a polymer-coated substrate is used, the substrate may be made of a wide variety of materials, including, but not limited to, stainless steel, silica, quartz, glass or polymers, including those listed above.

When the plasmas are used to treat the surface of an uncoated polymeric substrate the surface layers are simply converted into hard-carbon films. When the plasmas are used to treat coated substrates, the films may be thought of as overlay coatings on the underlying substrates. When the polymeric surface to be converted is a thin polymer layer on an underlying substrate, the thin layer may be wholly or partially converted into a hard carbon film. Either way, because the films are created from the substrates themselves or out of pre-deposited coatings, the production of the films avoids many of the adhesion problems associated with more conventional methods of applying carbon films to surfaces. In fact, when the surface layers of a polymeric substrate are converted into a hard carbon film, the film is actually integrated into the underlying substrate through partially converted polymer chains which bridge the interface between the hard carbon films and the underlying substrate. Some, portions of these bridging polymer chains have been cross-linked and incorporated into the hard carbon film, while other portions remain unconverted and incorporated into the substrate. As such, these partially converted polymer chains may be thought of as a transition layer between the hard carbon film and the underlying substrate.

The integration makes it possible to produce a film having a composition that transitions integrally into the composition of the substrate. As such, the composition at the interface between the film and the underlying polymer substrate may comprise a compositional gradient which differs from the abrupt interface achieved by other coating processes.

The polymeric coatings may be deposited onto the substrates by any suitable deposition means. Many such means are well known, including, but not limited to spin coating, dipping, casting, and the like.

Plasma treatment of the polymeric surfaces may be conducted in any suitable plasma reactor. Many such reactors are well-known and commercially available. Suitable reactors include continuous plasma reactors, low-pressure plasma reactors, and atmospheric-pressure plasma reactors.

The hard-carbon films are produced under plasma conditions which convert the polymeric surfaces into hard-carbon films. These conditions may vary depending on a variety of factors, including reactor type and the nature of the surface material to be treated. However, the reactor will typically operate at a pressure of between about 50 and about 500 mTorr, a power of about 50 to about 500 watts, and a temperature of about 20 to about 100° C. The $SF_x$ (x=1–5) species may generally be produced from an $SF_6$ precursor gas. In addition, the precursor gas may include other non-reactive carrier species, such as noble gases. In some embodiments, the precursor gas is substantially free of $O_2$, $H_2$ or hydrocarbons. Typically, the ratio of $SF_6$ to carrier species will be from about 99:1 to about 1:1. The reaction time may vary depending on how thick a film is desired. However, one advantage of the present plasma treatment methods is that, under certain conditions, they may produce a hard-carbon film on a polymeric substrate in no more than about 10 minutes. This includes embodiments where a hard-carbon film is produced in no more than about 5 minutes.

The examples below demonstrate that a soft polymeric surface, such as a PAA surface, can be converted to a material substantially harder than one of the hardest steels known, through a 5-minute plasma treatment and the resulting formation of nanometer size scale granular structures. Without wishing or intending to be bound to any particular theory of the invention, the inventors believe the surprising and unexpected results may be explained as follows. It is well-known that $SF_4$ converts C=O and COOH functionalities into $CF_2$ and $CF_3$ groups even under conventional, non-plasma-chemistry environments, and also transforms metal oxides into fluorides, which usually are in the same oxidation state. See, e.g., Cotton, F. A.; Wilkinson, G., *Advanced Inorganic Chemistry*, John Wiley & Sons, 1988. Recent data also indicate that oxygen atoms can be removed from C—O linkages in $SF_6$-RF-plasma environments. See Cruz-Barba, L. E.; Manolache, S.; and Denes, F., *Novel Plasma Approach for the Synthesis of Highly Fluorinated Thin Surface Layers*, Langmuir 2002, 18(24), pp 9393–9400. Plasma-generated $SF_x$ (x<6) ion species as well as neutral species might also play a significant role in these oxygen-removal processes. Fragmentation of $SF_6$ molecules in the discharge simultaneously generates extremely reactive fluorine atoms, which lead to the formation of fluorine molecules through recombination mechanisms, and initiates hydrogen atom-extraction reactions, eventually leading to the generation of HF and carbon-based free-radical species.

The inventors believe the simultaneous plasma-enhanced extraction of oxygen and hydrogen atoms from low and high molecular weight structures composed of C, O, and H atoms may be responsible for the unique hard carbon structures under appropriate experimental parameters using the appropriate polymeric surfaces. It is also possible that $SF_x$ and F active plasma species will preferentially etch the amorphous domains of macromolecular chain assemblies, relative to the more ordered zones. Plasma-enhanced oxygen extraction and dehydrogenation processes will eventually lead to the accumulation of shorter $sp^2$ and sp linkages relative to the $sp^3$ bonds, with the development of macromolecular chain-shrinking mechanisms. This process might also lead to the formation of more tightly packed (higher density) carbon-chain segments.

The production of hard carbon films from polymeric surfaces is further illustrated by the following non-limiting examples.

EXAMPLES

Equipment

Figure 1:
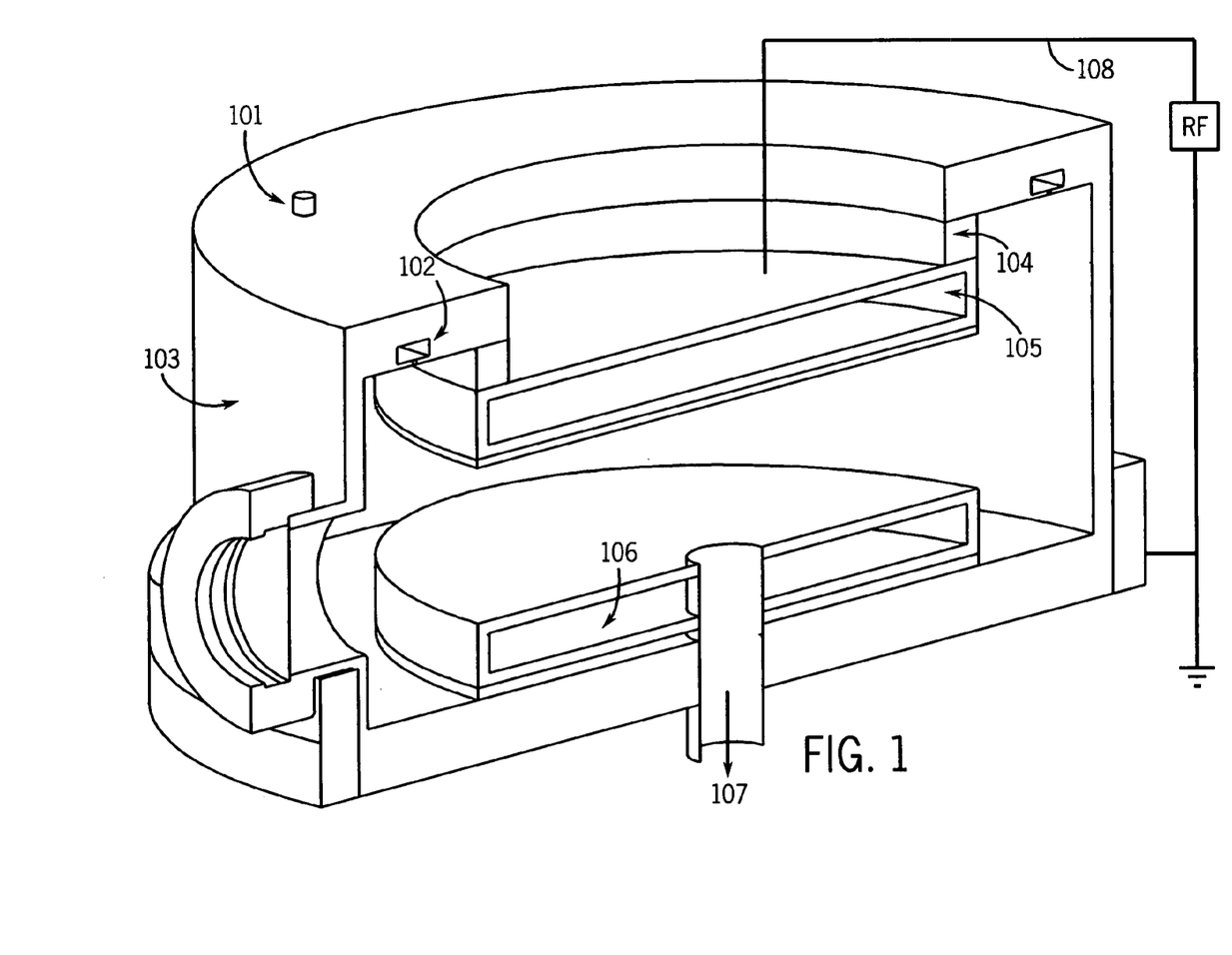
FIG. 1 is an illustration of a parallel plate cold-plasma reactor for use in producing hard carbon films.

A reactor of the type shown in FIG. 1 was first decontaminated by successively treating in it plasmas of argon and oxygen gases procured from Liquid Carbonic. Poly(acrylic acid) solutions (average Mw: 240,000) and $SF_6$ were purchased from Aldrich Chemical. PAA thin layers were pre-deposited from aqueous solutions (5% in DIUF-water) on select substrates using the spin-coating process. A Laurell Technologies WS-400A-6NPP/Lite Spin Coater was used for this purpose, and a 0.5 µm film of PAA was deposited. Substrates for deposition included, commercially available 1" diameter AISI 52100 bearing steel discs, 2" diameter silicon wafers, polycarbonate (PC), poly(methyl methacrylate) (PMMA), and polystyrene (PS).

The relative surface atomic compositions and the $C_{1s}$ and $O_{1s}$ linkages located in non-equivalent atomic positions of untreated PAA and plasma modified PAA surface layers were determined using a Perkin Elmer Physical Electronics 5400 small area ESCA system (Mg source; 15 kV; 300 W; 45° takeoff angle). In order to correct for surface-charge-origin binding energy shifts, calibrations were performed based on the well-known $C_{1s}$ peak that is observed at a binding energy of 285 eV. Surface morphologies of PAA-coated, plasma modified substrates were observed using a LEO 1530 Field Emission Scanning Electron Microscopy (SEM).

Hardness measurements and wear testing were performed using a low-load microhardness testing and nano-indentation techniques, and a fretting wear testing apparatus, respectively. In low-load microhardness testing, a fine oblong, pyramidal indenter (Knoop indenter, diagonal to depth ratio 30:1) is impressed on the surface of the sample with a certain load. In the present study loads of 5, 10, and 25 grams were used. The long diagonal of the resulting oblong impression on the sample surface is measured at 1000× magnification (because of the exceedingly small indentation size) using a microscope integrated with the hardness tester and correlated to the sample hardness. Microhardness measurements were made for a steel sample substrate before and after plasma surface modification treatment.

Since the indentation measurements are made after the applied load is removed, microhardness tests are not suitable for measurements on polymeric substrates which exhibit a high anelastic component of the deformation, resulting in a substantial recovery of the indentation upon the removal of the load. For these reasons, nanohardness measurements were performed to determine the hardness of the plasma-surface modified PAA film pre-deposited on polycarbonate and poly(methyl methacrylate) substrates. In nanohardness testing, a triangular pyramid shaped indenter is impressed on the sample with very low loads, and a load versus displacement plot is continuously generated as the indenter presses into the sample. Similarly, load versus displacement plots are generated upon unloading. Elastic and anelastic materials show a substantial hysteresis between the loading and unloading curves, which enables the evaluation of the elastic modulus.

For the present study, measurements of hardness and elastic modulus were performed using a Nano Indenter® DCM and MTS' patented Continuous Stiffness Measurement (CSM) technique, at the MTS facility at Oak Ridge, Tenn. With this technique, each indent gives hardness and elastic modulus as a continuous function of the indenter's displacement into the samples. Ten indentations were performed on each sample. Loading was controlled such that the loading rate divided by the load was held constant at 0.05/sec. Experiments were terminated at a depth of approximately 500 nm. Using the hysteresis produced by the unloading curve, the elastic modulus was also measured.

With the CSM technique employed, each indentation experiment allows a continuous measure of the contact stiffness, S. See Oliver, W. C.; Pharr, G. M. *An improved technique for determining hardness and elastic modulus using load and displacement sensing indentation experiments*, Journal of Materials Research 1992, 7(6), pp 1564–1583, which is incorporated herein by reference. Using the dynamic measure of S, and established formulae for elastic modulus and hardness (see, e.g., Oliver, W. C.; Pharr, G. M., *An improved technique for determining hardness and elastic modulus using load and displacement sensing indentation experiments*, Journal of Materials Research 1992, 7(6), pp 1564–1583; and Hay, J. L.; and Pharr, G. M., *Instrumental Indentation Testing*, In ASM Handbook of Mechanical Testing and Evaluation, Volume 8, pp 232–243, 2000, which are incorporated herein by reference), every individual indentation experiment yields elastic modulus and hardness as a continuous function of surface penetration.

The results for elastic modulus and hardness versus penetration for the ten indentation experiments on a particular sample are averaged together using discrete displacement windows of approximately 5 nm. Using the data in each window, an average and standard deviation are calculated.

The relative friction of the uncoated and coated steel samples were measured using a specially designed fretting wear tester, as described in Sandstrom, P. W.; Sridharan, K.; and Conrad, J. R., *A machine for fretting wear testing of plasma surface modified materials*, Wear 1993, 166(2), pp 163–168, which is incorporated herein by reference. Fretting wear refers to small displacement amplitude, high frequency oscillatory motion between two solid surfaces in contact. It thus provides for concentrated wear over a very small area. In this system, a spherical stylus is impressed on the test flat sample with a specific load and oscillated over short distances (10–500 µm) at high frequencies (10–100 Hz). The machine uses an electromagnetic actuator to provide this kind of high frequency, oscillatory motion. The design of the machine provides measurement of relative friction at the resonant frequency during the progress of the fretting wear tests.

The present study was conducted using a 3 mm diameter ruby (sapphire) ball stylus and an applied force of 0.2 N. The stylus material was chosen because of its high hardness and chemical inertness. The tests were carried out for 10,000 cycles over a linear displacement of 100 µm. The tests were performed at the resonant frequency of the machine which was determined to be 42 Hz (with the inclusion of the sample mass). At this frequency the machine is most sensitive to external dissipative forces, such as friction. The tests were performed in ambient conditions without a lubricant.

Plasma Modification of Surfaces

Low-pressure plasma-enhanced surface-modification reactions of the coated PAA films using an $SF_6$-derived plasma, were carried out in a cylindrical, capacitively coupled RF-plasma-reactor made of stainless steel and equipped with a 40 kHz power supply. The reactor consists of disc-shaped stainless steel electrodes; 20 cm in diameter, with a 5 cm gap between electrodes. A schematic illustration of the plasma reactor is shown in FIG. 1. The apparatus includes an inlet for the gases coming from mass-flow controllers 101; a gas mixing chamber 102; a stainless steel cylindrical chamber 103; an electric insulator ring 104; a heating/cooling capable upper electrode 105; and a grounded lower electrode 106; a vacuum line connected to a liquid nitrogen trap 107; and an RF power supply. The plasma surface treatments were performed for 5 minutes at 200 Watts RF power; at 200 mTorr pressure, and at room temperature. Another suitable reactor for use with the methods described herein is described in U.S. Pat. No. 5,534,232, which is incorporated herein by reference.

In a typical experiment, PAA solution was spin-coated onto a specific substrate surface, dried in a vacuum-oven at 45° C. and positioned symmetrically on the lower (grounded) electrode of the RF plasma reactor. The chamber was then evacuated to the base pressure, and once the pre-selected pressure was established by the introduction of the precursor gas, the plasma was ignited and sustained at the desired RF power for the desired treatment time. At the end of the reaction, the system was evacuated to base pressure, then purged with argon in re-pressurizing/evacuation cycles, and the sample was removed from the reactor and stored until analytical evaluations were initiated.

Figure 2:
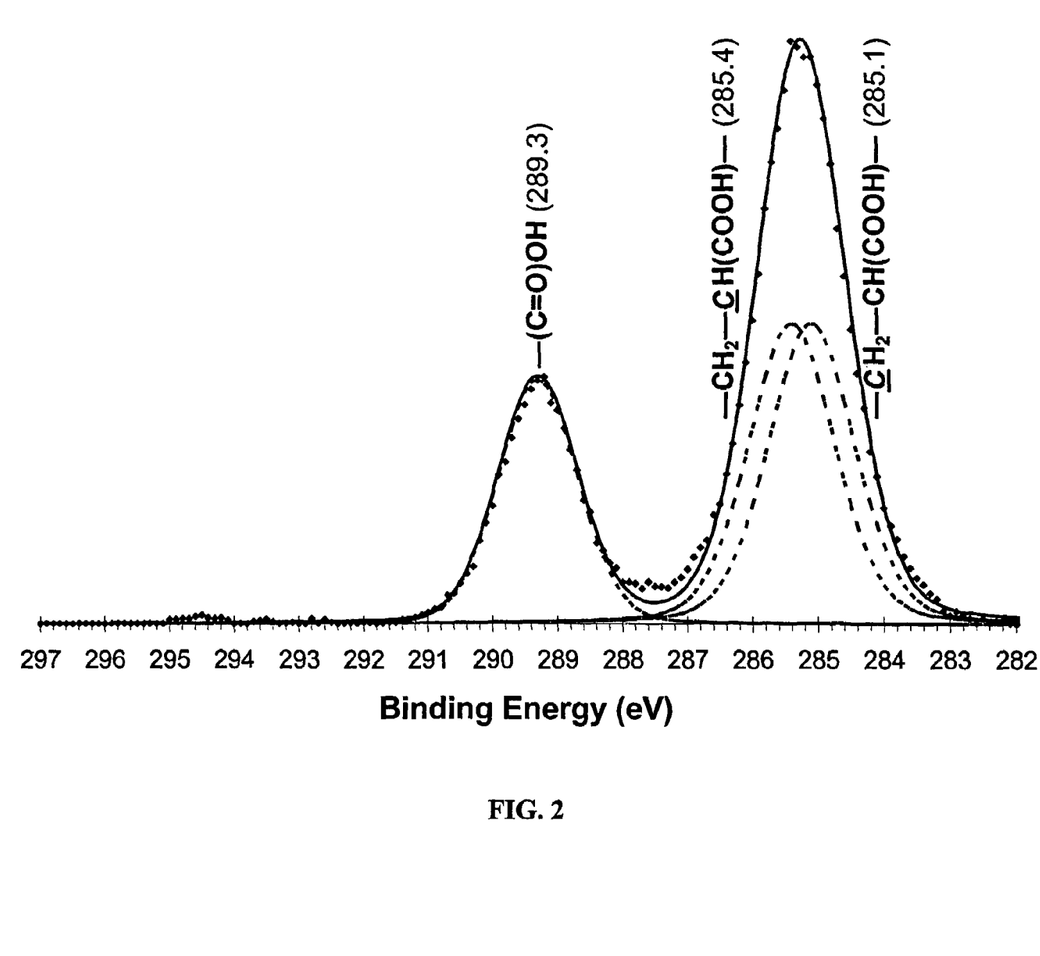
FIG. 2 is a $C_{1s}$ ESCA spectrum of poly(acrylic acid).
Figure 3:
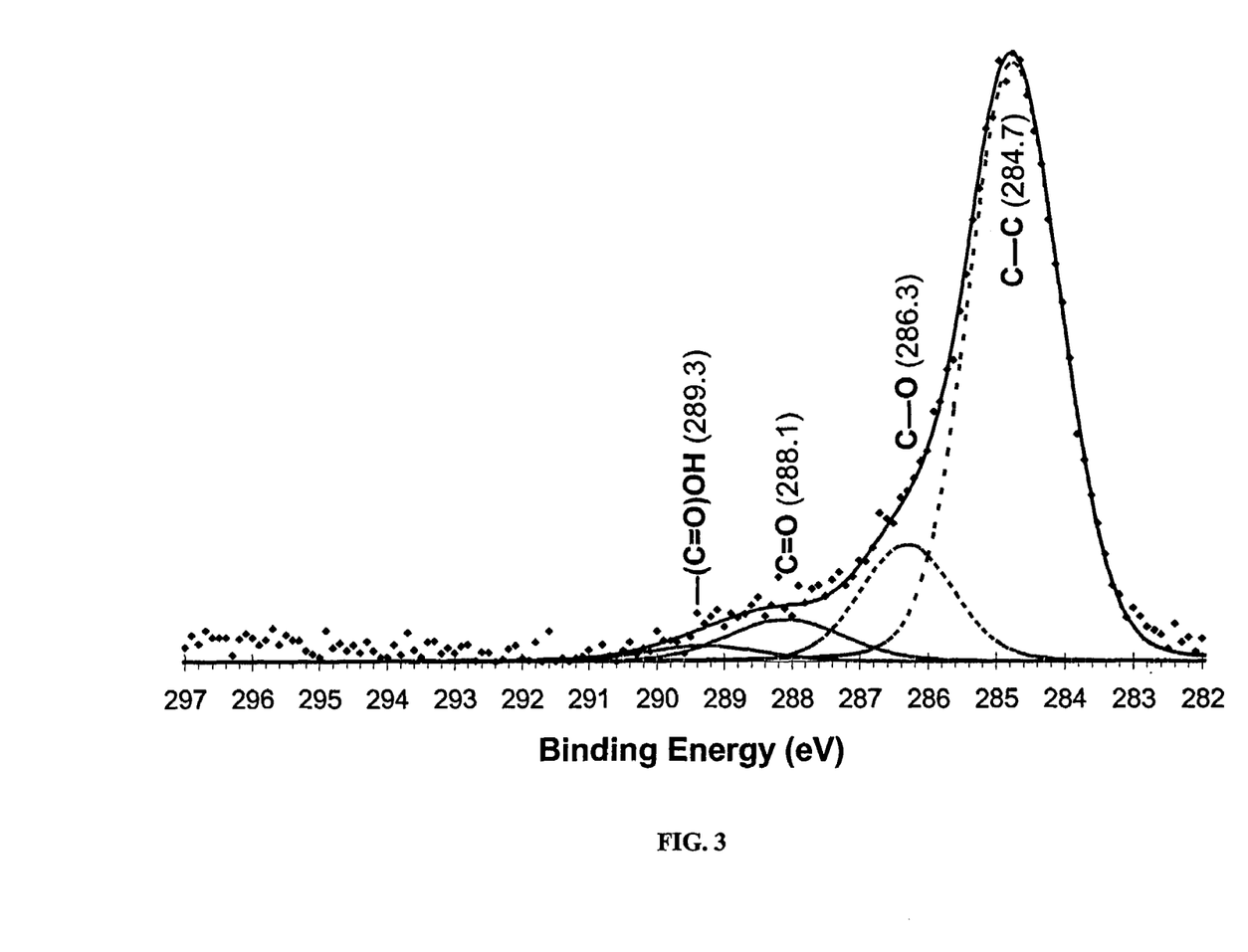
FIG. 3 is a $C_{1s}$ ESCA spectrum of plasma-treated poly (acrylic acid).

Results:

Electron spectroscopy for chemical analysis (ESCA) data collected from PAA thin layers before and after low pressure plasma surface treatments indicated the presence of very high relative carbon surface atomic composition (>95%) and a low oxygen atomic concentration. Typical ESCA spectra presented in FIGS. 2 and 3, show that the oxygen atoms are present in the form of C—O linkages (286.5 eV) and the C—C bonds appear in their unsaturated form (284.7 eV). This clearly indicates that most of the oxygen atoms were extracted from the PAA structure as a result of the interaction of $SF_x$ (x<6) ion species with the PAA layer. In addition, dehydrogenation mechanisms by HF formation appear to play a significant role in the formation of novel carbon-based structures. It was also noted that, under the processing conditions used (200 W; 200 mTorr, 5 minutes) the surface fluorination processes are negligible.

The plasma-treatment experiments performed using PAA-coated and untreated PMMA and PC substrates indicate that surface dehydrogenation and fluorination mechanisms can conveniently be controlled. This opens up very attractive possibilities for the controlled generation of diamond-like films.

Figure 4:
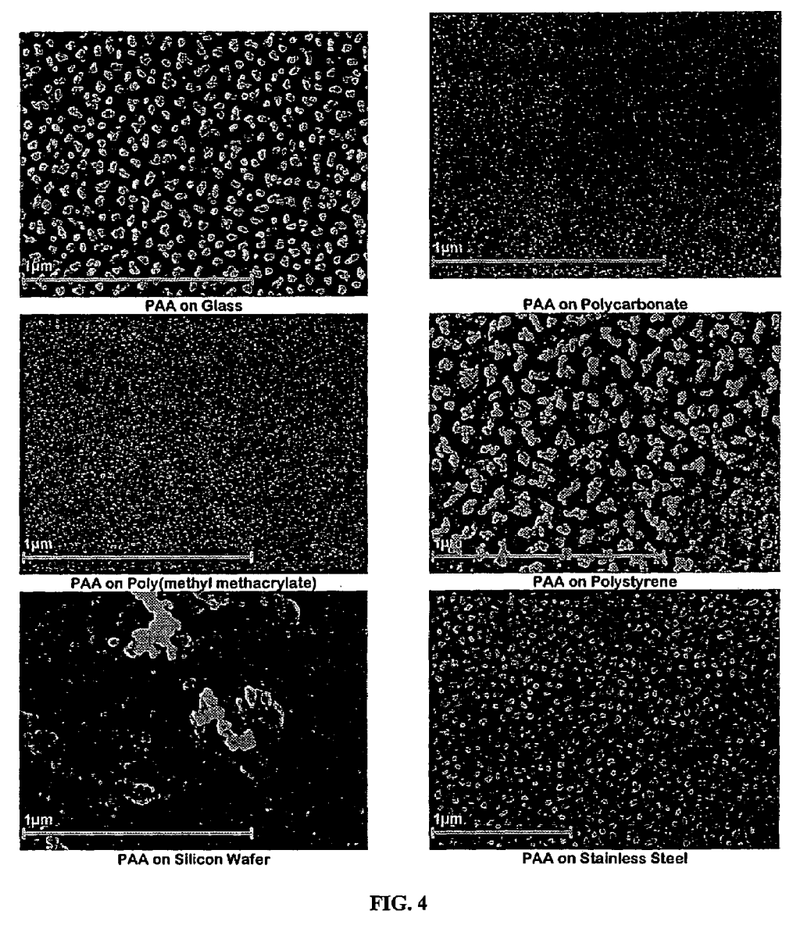
FIG. 4 are Scanning electron micrographs of plasma-treated PAA coatings on various substrates.
Figure 5:
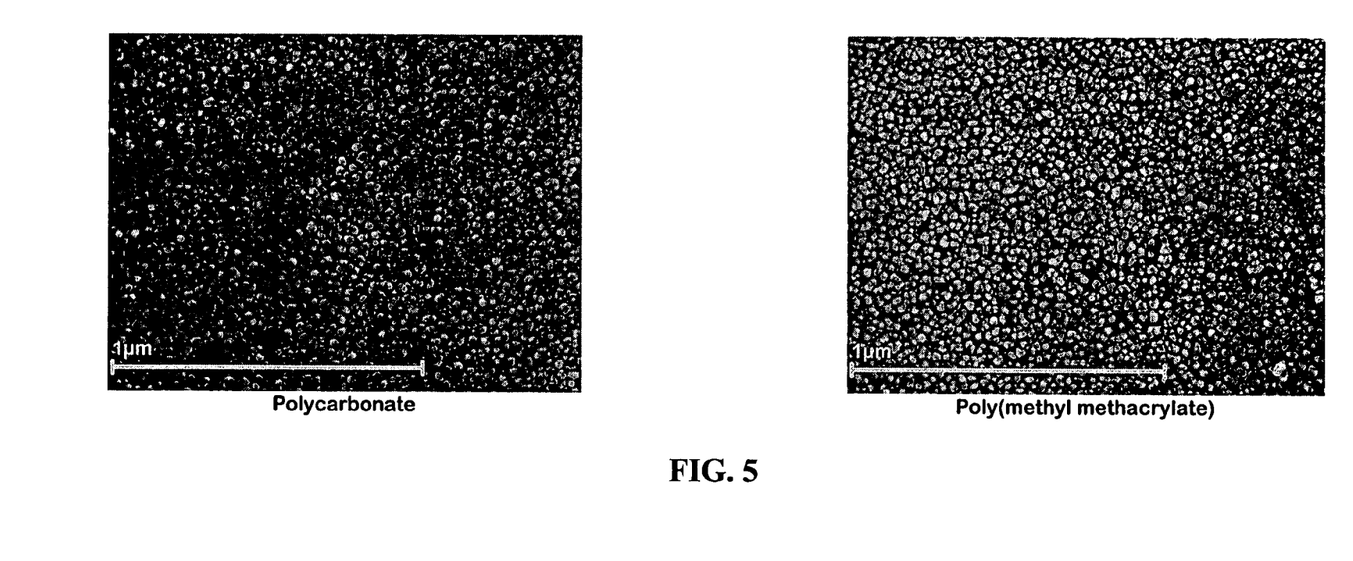
FIG. 5 are Scanning electron micrographs of plasma-treated PC and PMMA.

Scanning electron microscopy (SEM) images of 0.5 µm PAA-coated, plasma-treated surfaces on the various substrates are shown in FIG. 4. In addition, SEM images of the plasma treated PMMA and PC without prior deposition of PAA film are shown in FIG. 5. The remarkable similarities in their structures appear to indicate that these specific surface-morphologies can be produced either as over-lay coatings (e.g., on metals) or by the intrinsic conversion of near-surface regions of oxygen- and carbon-based organic polymer substrates into ordered carbon-domain arrays.

The uniform and unique granular surface morphologies generated as a result of the plasma surface treatment suggests that the plasma species of charged and neutral $SF_x$ (x<6), as well as fluorine atoms and ions, etch selectively the less ordered macromolecular-chain-assemblies relative to the more ordered domains (crystallites). In addition they appear to facilitate the efficient extraction of oxygen and hydrogen atoms from the top layers of the polymeric structures. The slight differences in topography for the ordered macromolecular clusters (carbon domains) generated by $SF_6$-derived plasma on various polymer surfaces, might be related to the existence of different ab initio crystallite-domain densities in the precursor macromolecular layers. The formation of ordered-carbon-structures however, might be a result of mechanisms similar to those occurring in the CVD and PECVD deposition of diamond-like structures, where the excess hydrogen atoms promote the dominant hydrogen extraction and graphite ablation processes.

Figure 6:
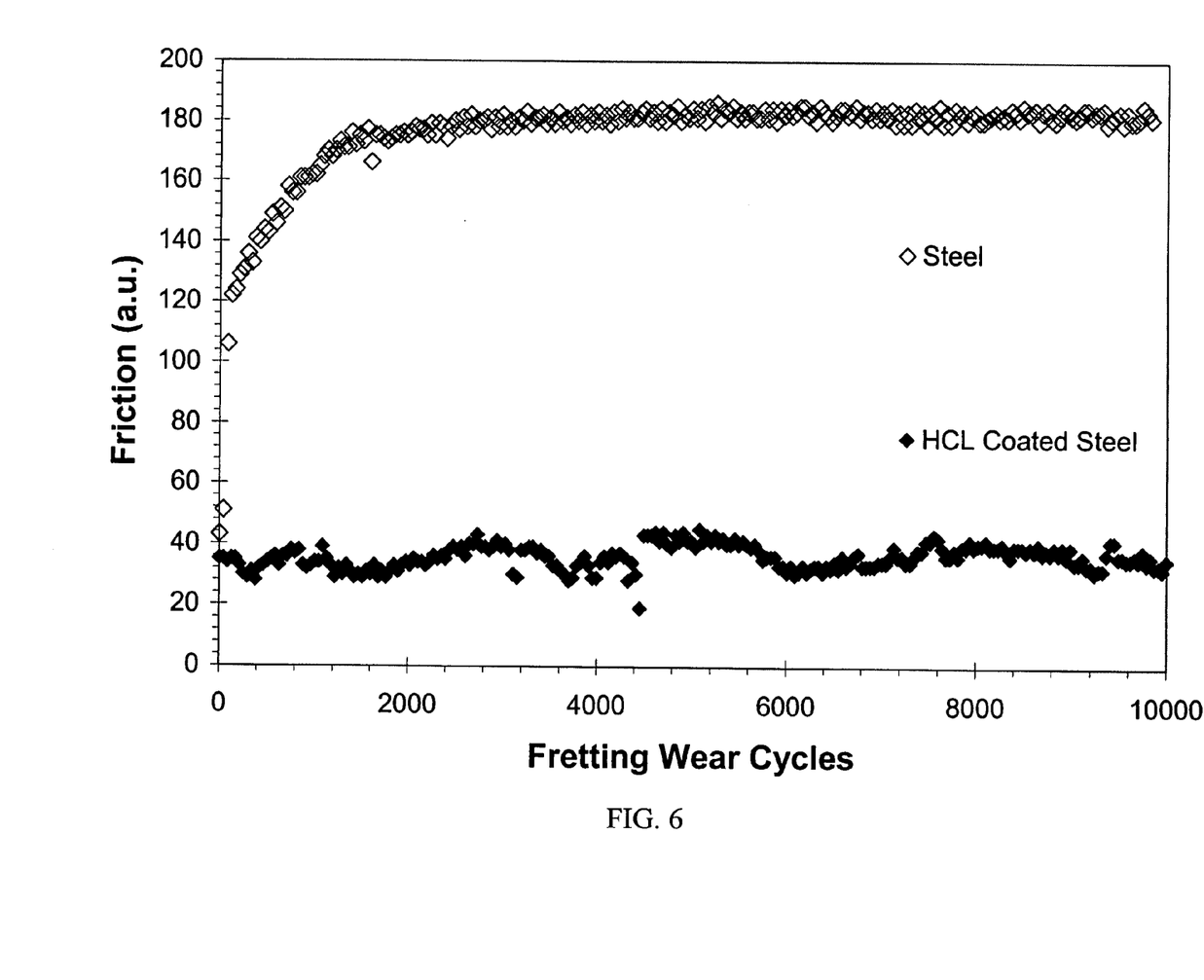
FIG. 6 is a Fretting Wear test plot of untreated and plasma-treated PAA coated stainless steel.

Wear and hardness measurements performed on plasma-modified polymeric layers are indicative of the formation of very hard structures. Initial scratch testing with a stainless steel knife (Mohs hardness of 5.5) indicated qualitatively that the plasma surface modified films were very slippery and resistant to scratching. Due to an enormous demand for wear and erosion resistant coatings in a wide variety of industries, surface hardness and friction measurements of these samples was performed FIG. 6 shows the results of the low-load micro-hardness tests performed at various loads on the steel sample deposited with PAA and then subjected to $SF_6$-derived plasma surface treatment. For comparison, the micro-hardness measurements made on untreated steel are also shown. The hardness of the coated sample is substantially higher than the untreated steel. As mentioned earlier, in microhardness testing, depending upon the load, the indentation depth is larger than or at least a substantial fraction of the surface film thickness. Therefore, at larger test loads, substantial substrate effects are incorporated and the hardness of the coated sample approaches that of the uncoated sample. As the test load is decreased, the indentation depth approaches the film thickness and the enhanced hardness of the film becomes more apparent. However, even at the lowest loads employed, the indentation depth is a substantial fraction of the film thickness and the hardness improvements are underestimated. This combined with the fact that the steel hardness is already very high leads one to speculate that the intrinsic hardness of the film is indeed very high.

Figure 7:
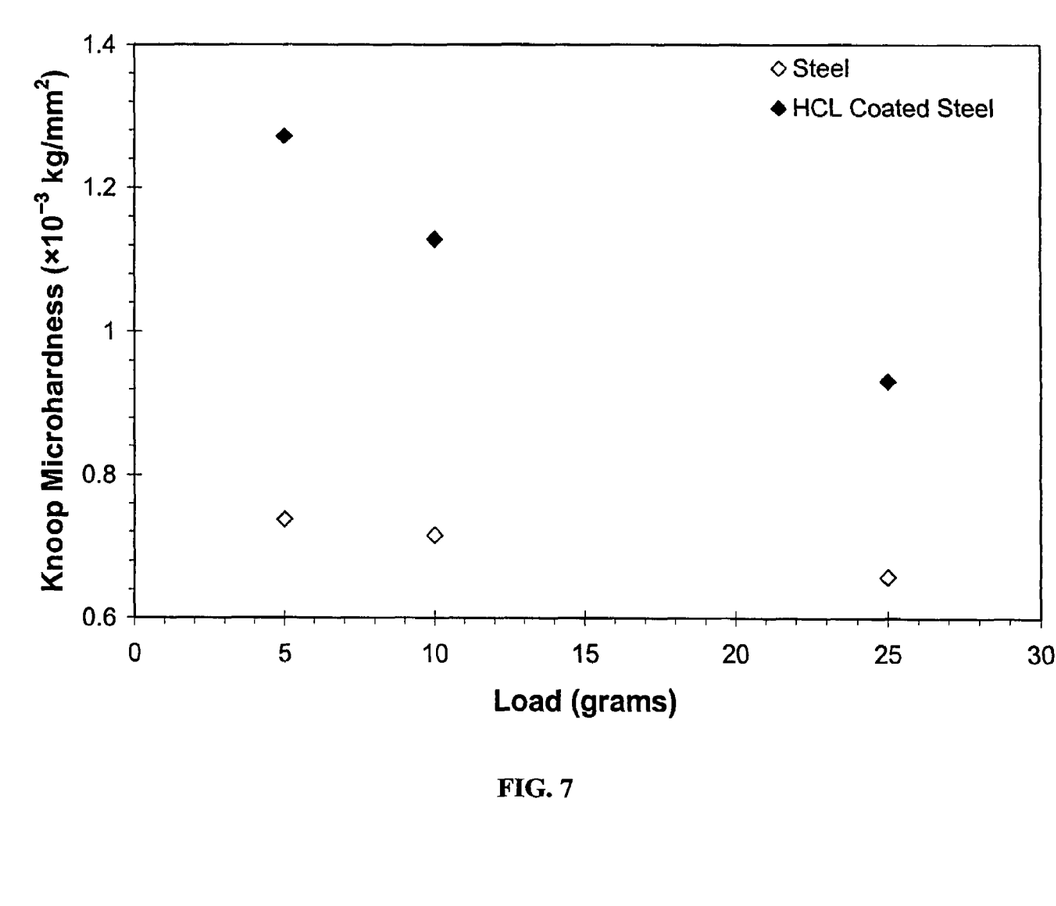
FIG. 7 is a Knoop Microhardness test plot of untreated and plasma-treated PAA coated stainless steel.
Figure 8:
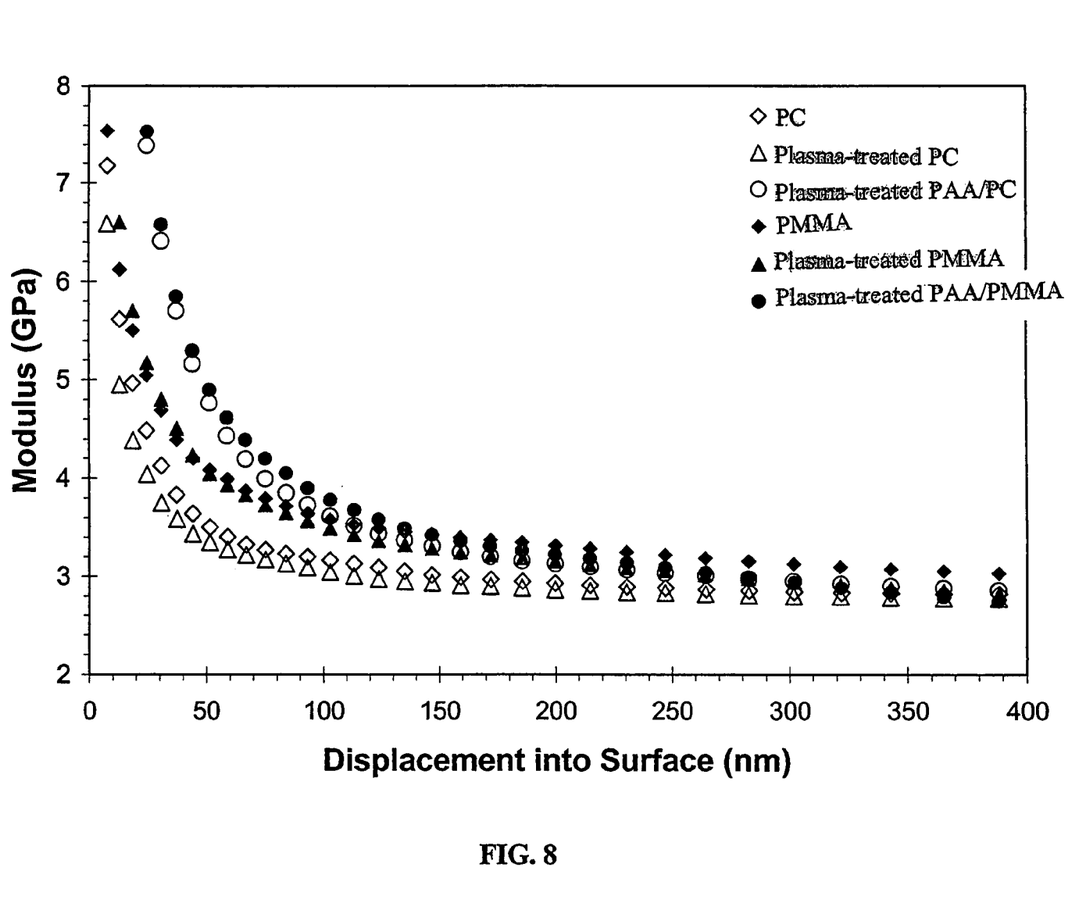
FIG. 8 is a Modulus plot of untreated and plasma-treated PC, PAA coated PC and PMMA.
Figure 9:
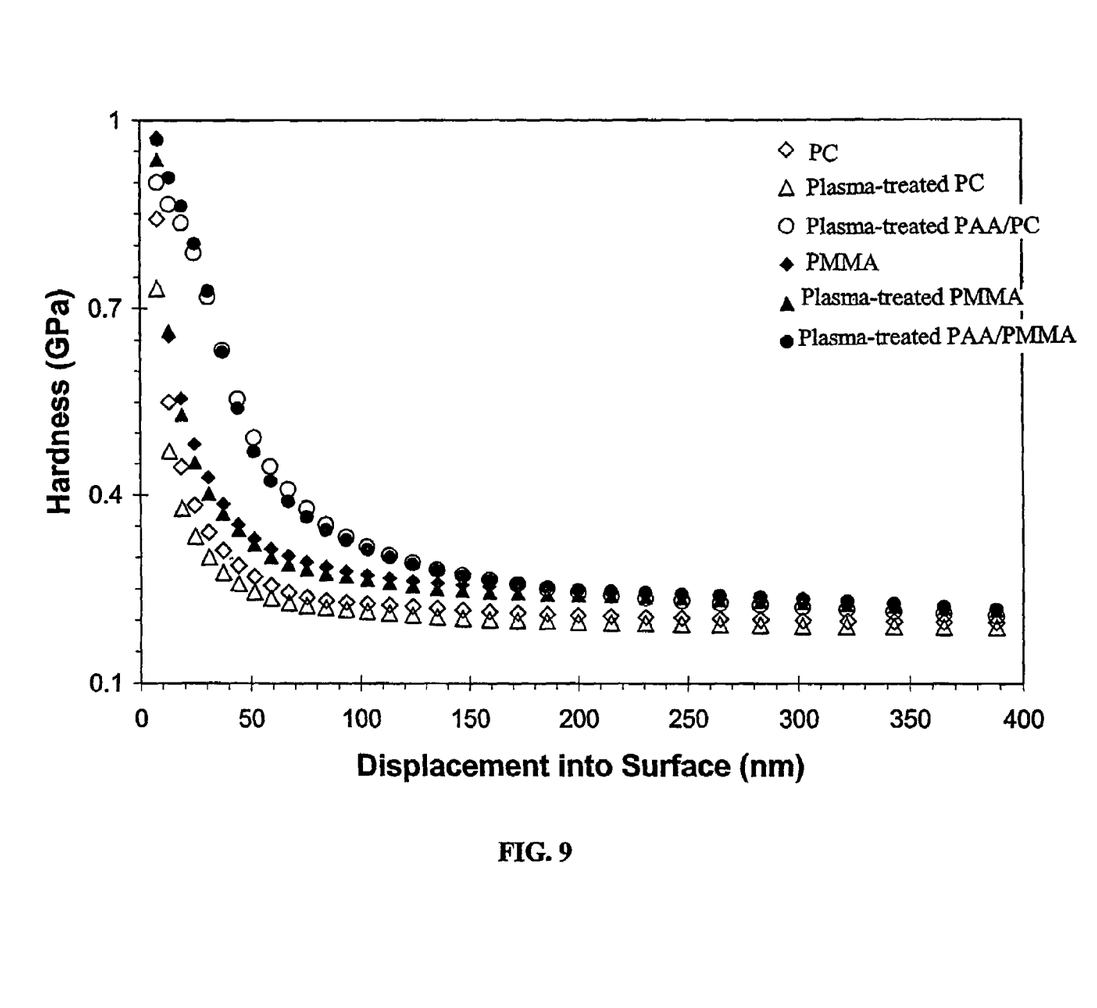
FIG. 9 is a Nanohardness plot of untreated and plasma-treated PC, PAA coated PC and PMMA.

FIG. 7 shows the results of the friction results after the fretting wear tests against a ruby ball stylus. Note that the friction against the coated sample is about three times lower than the steel. It was also noted that the ruby ball (a variety of corundum, $Al_2O_3$) involved in the wear-test experiment experienced considerable wear the plasma surface modified layer. Given the high hardness of corundum, this observation provides a testament to the high hardness of the surface layers produced by plasma surface treatment. FIG. 7 also reveals that the hardness of the coating is substantially higher than that of steel. Fretting data resulting from coated and unmodified steel substrates (FIG. 7) substantiate the conclusion that the plasma-generated carbon-layers exhibit an extremely hard character.

It is understood that the invention is not confined to the particular embodiments set forth herein as illustrative, but embraces all such forms thereof as come within the scope of the following claims.

What is claimed is:

1. A method for producing a hard carbon film on a polymeric surface, the method comprising:
   (a) exposing the surface to a plasma comprising one or more $SF_x$ species where x may range from 1 to 5; and
   (b) converting the polymeric surface into a film comprising at least about 90 atomic percent carbon.

2. The method of claim 1, wherein the polymeric surface comprises carbon, oxygen and hydrogen atoms.

3. The method of claim 1, wherein the polymeric surface is oxidized.

4. The method of claim 1, wherein the polymeric surface is converted into a film comprising at least about 95 atomic percent carbon.

5. The method of claim 1, wherein the surface is exposed to the plasma at a pressure from about 50 to 500 mTorr.

6. The method of claim 1, wherein the surface is exposed to the plasma at a temperature from about 20 to 1000° C.

7. The method of claim 1, wherein the surface is exposed to the plasma for no more than about 10 minutes.

8. The method of claim 1, wherein the polymeric surface comprises a polymer selected from the group consisting of poly(acrylic acid), poly(methyl methacrylate) and polycarbonate.

9. The method of claim 1, wherein the polymeric surface comprises a polymer selected from the group consisting of polyethylene, polypropylene and polystyrene.

10. The method of claim 1, wherein the polymeric surface is comprised of a polymeric layer disposed on an underlying substrate.

11. The method of claim 10, wherein the polymeric layer comprises poly(acrylic acid).

12. The method of claim 1, wherein the polymeric surface is exposed to the plasma for a time sufficient to produce a film comprising no more than about 5 atomic percent oxygen.

13. The method of claim 1, wherein the polymeric surface is exposed to the plasma for a time sufficient to produce a film comprising no more than about 1 atomic percent hydrogen.

14. The method of claim 1, wherein the exposure of the polymeric surface to the plasma produces a film comprising no more than about 1 atomic percent fluorine.

15. The method of claim 1, wherein the plasma is substantially free of oxygen.

16. The method of claim 1, wherein the plasma is substantially free of hydrocarbon precursors.

17. The method of claim 1, wherein the polymeric surface is exposed to the plasma for a time sufficient to produce a film having a thickness from about 0.5 to 5 microns.

18. A surface-modified substrate comprising:

(a) a polymeric substrate; and (b) a surface film comprising a cross-linked network of carbon chains integrated into the polymeric surface, wherein the surface film comprises at least 90 atomic percent carbon, and further, wherein the substrate is window, a medical implant or a lens.

\* \* \* \* \*

UNITED STATES PATENT AND TRADEMARK OFFICE
CERTIFICATE OF CORRECTION

PATENT NO. : 7,138,180 B2  Page 1 of 1
APPLICATION NO. : 10/686790
DATED : November 21, 2006
INVENTOR(S) : Ferencz Denes, Sorin Manolache and Luis Cruz-Barba It is certified that error appears in the above-identified patent and that said Letters Patent is hereby corrected as shown below:

Claim 6, Column 10, Line 67 of the issued patent, "1000° C" should be changed to --100° C--.

Signed and Sealed this

Thirteenth Day of March, 2007

JON W. DUDAS
*Director of the United States Patent and Trademark Office*